United States Patent [19]

Kim et al.

[11] Patent Number: 5,275,663
[45] Date of Patent: Jan. 4, 1994

[54] PROCESS FOR PREPARING HYDROPHILIC POLYMER FILM AND APPARATUS THEREOF

[75] Inventors: Young H. Kim; Jae W. Kim; Jeong W. An; Woog Y. Lee, all of Cheonlabuk-Do, Rep. of Korea

[73] Assignee: Sam Yang Co., Ltd., Seoul, Rep. of Korea

[21] Appl. No.: 766,340

[22] Filed: Sep. 27, 1991

[30] Foreign Application Priority Data

| Sep. 27, 1990 | [KR] | Rep. of Korea | 90-15402 |
| Sep. 29, 1990 | [KR] | Rep. of Korea | 90-15876 |
| Sep. 29, 1990 | [KR] | Rep. of Korea | 90-15877 |
| Jun. 18, 1991 | [KR] | Rep. of Korea | 91-10041 |

[51] Int. Cl.$^5$ .................................................. B05B 1/00
[52] U.S. Cl. .............................. 118/641; 427/508; 427/520; 250/504 R; 118/68; 118/69; 118/643; 118/67; 156/380.9
[58] Field of Search .................. 250/493.1, 504; 118/67-; 156/380.9; 427/54.1, 508, 520

[56] References Cited

U.S. PATENT DOCUMENTS

| 3,034,926 | 5/1962 | Carter et al. | 118/67 |
| 4,983,852 | 1/1991 | Burgio | 250/504 R |
| 5,097,136 | 3/1992 | Meyer | 250/504 R |
| 5,124,559 | 6/1992 | Zertani | 250/504 R |

Primary Examiner—W. Gary Jones
Assistant Examiner—John Hoffmann
Attorney, Agent, or Firm—Birch, Stewart, Kolasch & Birch

[57] ABSTRACT

An apparatus for coating a hydrophilic film which includes a light reaction chamber having UV lamps on either side of the film, two cooling fans and a solvent deflation fan. There are also an air drying plates and coating nozzles.

8 Claims, 2 Drawing Sheets

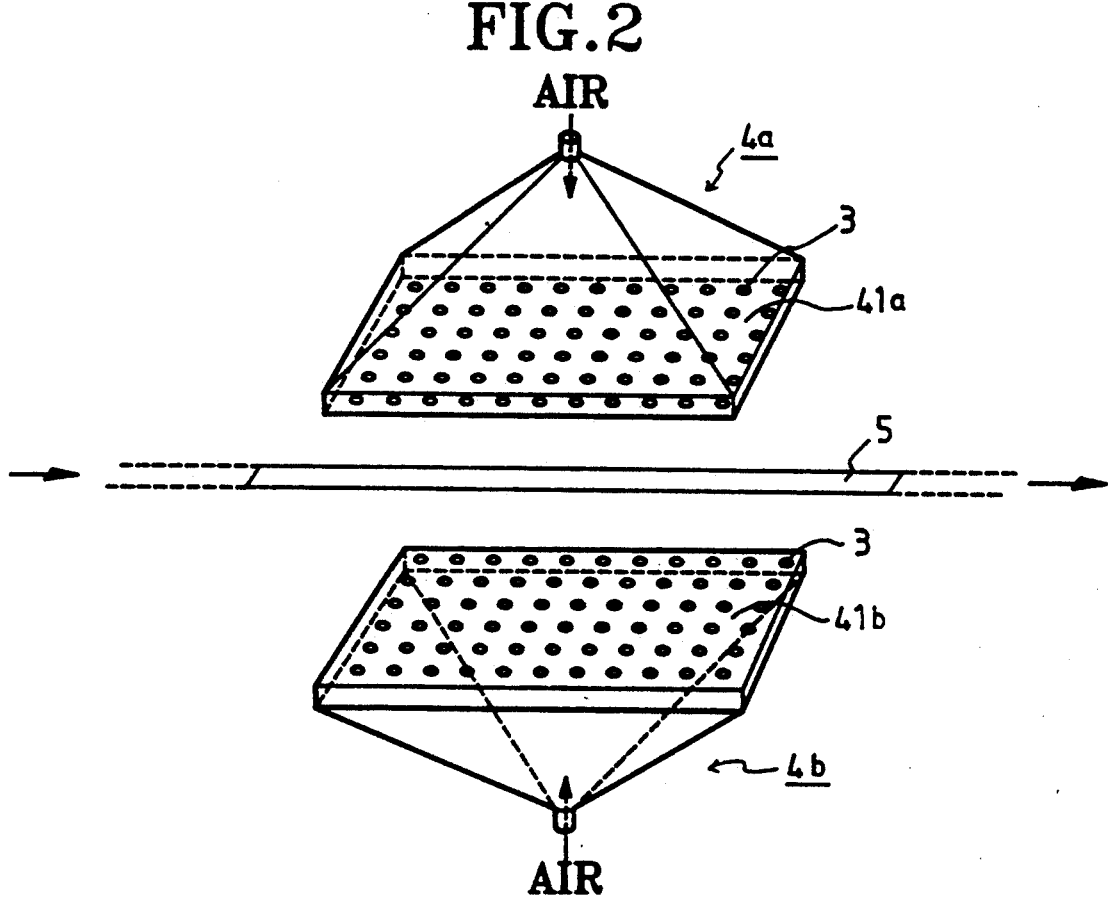
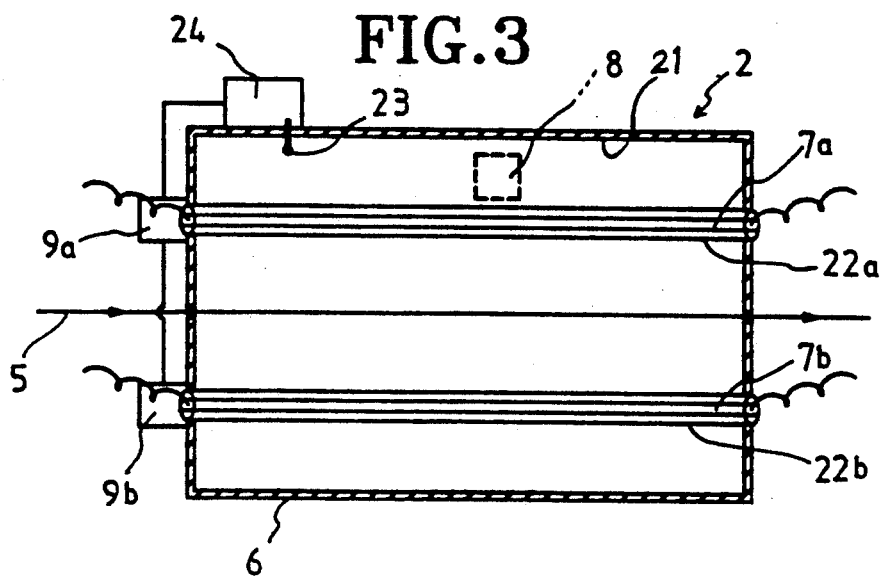

PROCESS FOR PREPARING HYDROPHILIC POLYMER FILM AND APPARATUS THEREOF

BACKGROUND OF THE INVENTION

1. Field of the Invention

The present invention relates to a process for preparing a hydrophilic polymer film and particularly, to a process for the preparation of hydrophilic polymer film, which comprises modifying polymer film by coating a photopolymerization solution containing a hydrophilic monomer of low water swelling ability and an UV stabilizer on the film surface pre-treated with a high frequency, and photopolymerizing the solution so as to improve a hydrophilic property, a climate-resistibility, and a blocking property.

2. Description of the Prior Art

Generally, polyolefin films have been widely used in agricultural fields and packing materials fields because of their good mechanical properties, optical property, nontoxic property, and durable flexibility. However, since such conventional films have hydrophobic properties on the surface thereof, the transparency of such conventional films is significantly reduced by condensation of moisture on the inner surface thereof when used in a simple green house built from such polymer films, due to the reduction of the sunlight transmittance through such films.

As a result, the crop of vegetables in the simple green house is reduced and the period of harvest takes a long time. Also, the temperature effect in the green house is reduced. If drops of water condensed on the surface of such films come down on the flower of a crop cultivated in the green house, the crop withers or does not bear fruit.

Due to the hydrophobic property of the film surface, coating materials such as water soluble ink, gelatin, and so on are difficult to coat on the surface thereof. When such films are used for packaging material of foods, the food may become spoiled or decayed due to the drops of water formed in the packaged film surface.

In order to avoid the above problems, and to make the use of polyolefin films more practical, the film surface has been modified as follows.

For example, there is a method for preparing a hydrophilic film by compounding polyethylene resin and a special surfactant, and a method for modifying the polyethylene film by coating a special surfactant on the surface thereof.

However, since the surfactant used on the film is washed away easily by drops of water, the hydrophilic property of the such films can be reduced.

Recently, there has been developed a method of modifying such films by grafting a hydrophilic material on polyethylene film. The film modified by this method continuously maintains the hydrophilic property. But discoloration of the film may occur since the climate-resistibility is not good, and a blocking phenomena sticking between the films occurs on the film surface because of the use of hydrophilic substances having a high water swelling ability such as acrylic acid, methacrylic acid, acrylamide, methacrylamide, 2-hydroxyethylmethacrylate, and N-vinylpyrrolidone.

SUMMARY OF THE INVENTION

Accordingly, it is an object of the present invention to provide an improved process for the preparation of a hydrophilic polymer film, which comprises pre-treating with high frequency on the surface, and coating and photopolymerizing a photopolymerization solution containing hydrophilic monomer having a low water swelling ability, and an UV initiator.

Another object of the present invention is to provide a process for preparing a hydrophilic polymer film by coating a photopolymerization solution containing a hydrophilic monomer, a photo-initiating agent, a photo-enhancing agent, and a crosslinking agent on the surface of film which is pre-treated with high frequency, and photopolymerizing the solution wherein the photopolymerization solution contains a hydrophilic substance of 1 to 40% by weight selected from the group consisting of acrolein, acrylonitrile, and acryloylchloride, and an UV stabilizer of 0.01 to 10% of by weight selected from the group consisting of the following structural formula (I), (II), and a mixture of the formula (I) and (II), and forming a hydrophilic layer on the surface by a photo-reaction.

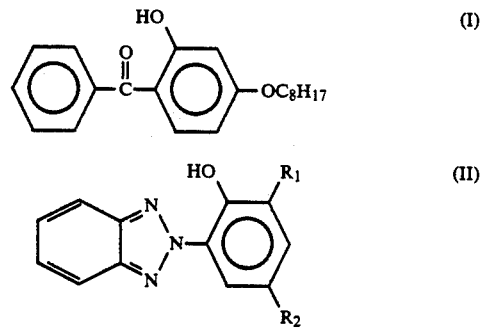

wherein,
$R_1$ is hydrogen or t-butyl group,
$R_2$ is methyl or t-butyl group.

A further object of the present invention is to provide an apparatus for preparing a hydrophilic polymer film, which includes coating equipment and a light initiator for continuous processes, a pair of air supply hoppers and disposed between the coating equipment and the light initiator and symmetrical to the upper and lower side of a polymer film, the light initiator containing a pair of UV lamps and disposed in a light reaction chamber, a solvent deflation fan and cooling fans and disposed at a side of the chamber.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows a pair of air supply hoppers of the apparatus in accordance with the present invention; and FIG. 3 shows a light initiator of the apparatus in accordance with the present invention.

DESCRIPTION OF THE PREFERRED EMBODIMENTS

Figure 1:
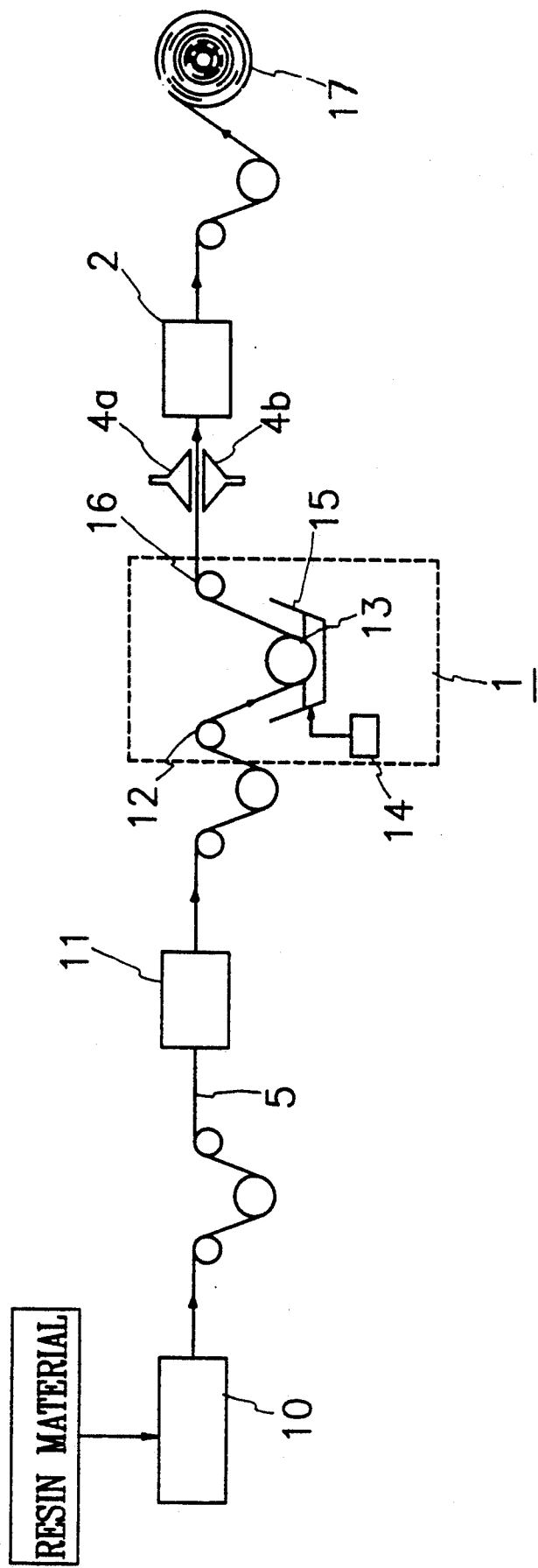
FIG. 1 schematically shows the process of the preparation of a hydrophilic polymer film and the apparatus thereof in accordance with the present invention.

Referring now in detail to the drawings for the purpose of illustrating preferred embodiments of the present invention, the process for preparing a hydrophilic polymer film as shown in FIGS. 1 and 3, comprises coating a thermoplastic film pre-treated with high frequency with a new polymerization solution.

The polymer film substrate used in the present invention may be prepared by a thermoplastic polymer such as polyethylene, polyvinylchloride, polypropylene, polystyrene, poly-4-methyl-1-pentane, polyamide-6, polycarbonate, polyethyleneterephthalate, or polypentadiene by a conventional blow film extrusion method.

The photopolymerization solution consists of hydrophilic monomer of about 1 to 40% by weight, a photo-initiating agent of about 0.01 to 5% by weight, a cross-linking agent of about 0.01 to 5% by weight based on the weight of solvent, to be dissolved the solvent.

One or a mixture selected from the group consisting of acrolein, acrylonitrile, and acryloylchloride can be used as the hydrophilic monomer, when the amount used is less than 1%, the water absorption effect of the film is reduced, if more than 40% is use the characteristics of the film are reduced, and the blocking property is increased.

In the present invention, acetophenone, isopropylbenzoinether, benzoylperoxide, benzophenone, N,N'-azobisisobutyronitrile and so on can be used as the photo-initiating agent, and trimethylolpropanetrimethacrylate, trimethylolpropanetriacrylate, pentaerythritoltriacrylate, etc. may be used as the crosslinking agent.

The photo-enhancing agent is used for the reduction of the oxygen effect during polymerizing process. For example, N-butyl amine, diethyl amine, ethylmethacrylate, triethylene tetramine, ethanol amine, ethyl amine, diethyl amine, trimethyl amine, or a mixture of them may be used as the photo-enhancing agent.

In accordance with the present invention, the above structural formulas (I), (II) in an amount of, or a mixture of formulas (I) and (II) about 0.01 to 10% by weight based on the weight of the photopolymerization solution are used as a UV stabilizer. When the amount used is less than 0.01%, the stable effect cannot be expected and the tensile strength of the film is reduced. When more than 10% is used, the hydrophilic characteristic of the film is reduced.

To dissolve the hydrophilic monomer together with the above agents and the UV stabilizer, methylalcohol, ethylalcohol, acetone, water, hexane, methylethyl ketone or a mixture of them are used as the solvent.

The photopolymerization solution prepared by the above process is coated on the polymer film pre-treated with high frequency and having the surface tension of 36 to 60 Dyne/cm, wherein the film may be pre-treated with high frequency by a conventional method for creation of activity points of graft-polymerization on the film surface.

Then the coating amount of the solution is adjusted to about 0.8 to 40 g/cm$^2$ and the residual amount of solvent on the coated film surface becomes 0.07 to 3.6 g/m. For the photo-reaction, the coated film surface is exposed to a UV light at a temperature of about 10° to 70° C. for 1 to 600 second. A source of UV light will be employed such as Kern-arc light, a low pressure mercury lamp, a high pressure mercury lamp, a xenon lamp, a fluorescent lamp, a metal halogen lamp, a tungsten lamp, sunlight, and so on.

As a result, a hydrophilic layer of thickness of 0.01 to 1 μm is formed on the film surface.

The hydrophilic film modified according to the above process exhibits an excellent hydrophilic property, an excellent climate-resistibility, and a blocking property due to the use of hydrophilic monomer having lower water swelling ability, and the use of a UV stabilizer of the above formula (I) and/or (II).

As shown in FIG. 1, the apparatus for modifying the polymer film according to the above process of the invention comprises equipment 10 for manufacturing film with a blow film extruder, high frequency treatment equipment 11 for pre-treating the film surface, coating equipment 1 for coating the photopolymerization solution having hydrophilic properties and a light initiator 2 for photo-reacting the solution with the film surface as a continuous system.

For the modification of the polymer film, a film 5 manufactured by the equipment 10 and pre-treated by the equipment 11 passes a movable guide roll 12, and then passes through a solution vessel 15, where it is contacted with a photopolymerization solution from supply device 14 by a coating roll 13 having a diameter of 1.5 to 3 times than that of the guide roll 12.

Thereafter, the film 5 passes an other guide roll 16, and gets through a pair of air supply hoppers 4a and 4b which supply air to the upper and lower surfaces of the film 5 at the rate of 0.01 to 3 m/sec.

The air supply hoppers 4a and 4b as shown in FIG. 2 have distributing plates 41a and 41b. The length thereof is 10 to 100 cm, the width thereof is 10 to 500 cm, and each distributing plate contains a plurality of air supply apertures 3 with a diameter of 1 to 3 mm in a ratio of 1 aperture/cm$^2$.

The air supply hoppers 4a and 4b are placed at a distance of 5 cm to 20 cm from the upper and lower surfaces of the film 5 which passes between them. Therefore, a coating equipment 1 adjusts the coating amount of the hydrophilic substance to maintaining the coating amount at 0.8 to 40 g/m$^2$ by movable guide rolls 12 and 16, which are movable upward and downward. The supply hoppers 4a and 4b equally supply air on the film surface, and then the residual amount of solvent in the coated photopolymerization solution is adjusted to 0.07 to 3.6 g/m$^2$ on the film surface.

As shown in FIG. 3, the film 5 coated by the photopolymerization solution passes a light reaction chamber 6 having slits of 2 to 10 mm formed in both sides to allow passage of the film 5, and having an interior aluminum reflection plate 21. In the interior of the chamber 6, a pair of UV lamps 7a and 7b are placed for irradiating UV light of 30 to 160 W/cm each of which is at a distance of 5 to 50 cm from the film 5 passing through the slits in the sides of the chamber, and are protected by lamp protecting tubes 22a and 22b of diameter of 50 to 100 mm. Cooling fans 9a and 9b for cooling lamp radiated heat are disposed in front of the lamp protecting tubes 22a and 22b, and a solvent deflation fan 8 is placed at a side of the chamber 6 to deflate the volatilized solvent.

According to the present invention, the exposure time of the film 5 in a light initiator 2 has a range of 1 to 600 sec. When the exposure time is less than 1 sec, the photo-reaction on the film surface does not occur, and when the exposure times more than 600 sec, the characteristics of the film are reduced by the UV light. The exposure temperature may be controlled by the cooling fans 9a and 9b and a temperature auto controller 24 connected to a sensor 23 to maintain at temperature of 10° to 70° C. in chamber 6. When the temperature is less than 10° C., the film 5 is not dried, and when the temperature is more than 70° C., the mechanical properties of the film are changed.

Under the above conditions, a photo-reaction occurs between the film and the hydrophilic substance on the film surface to form hydrophilic layer. The product is transferred to a rolling roll 17.

The film 5 modified in accordance with the process and the apparatus of the present invention has a hydrophilic layer, and the film 5 has a very long durability time of more than 90 days for the hydrophilic property.

The present invention may be accomplished by the factors of the pre-treatment of the surface, the coating of the hydrophilic substance, the adjustment of solvent amount, the photoreaction conditions and the speedy removal of volatile solvent. Since the film according to this invention has excellent block property, hydrophilic property, and climate-resistibility, it can be used as a packing film for goods or foods and can be used in agriculture, and the condensation of water will not occur on the film surface, and the transparency of the film is not reduced.

The present invention will now be described in more detail in connection with the following examples, which should be considered as being exemplary and not limiting the present invention.

EXAMPLE 1

The hydrophilic polymer film was produced as follows.

Polymer Film

Low-density polyethylene: melt index 2, 4 density: 0.924 t/cm$^3$ thickness: 30 $\mu$m

High Frequency Treatment of the Film

Capacity of a generator: 7.5 Kw
Length of electric pole: 1 m
Interval of film and electric pole: 1 mm
Output voltage: 160 V
Surface tension of the treated film: 40 Dyne/cm

Composition of Photopolymerization Solution

Acrylonitrile: 150 g
Acetophenone: 50 g
Pentaerythritol triacrylate: 5 g
Triethylamine: 5 g
UV stabilizer (formula (I)): 5 g
Solvent (methyl ethyl ketone): up to 720 g

Conditions for the General Process

Coating amount of photopolymerization solution: 8 g/m$^2$
Diameter ratio for guide roll and coating roll: 1:2
Rate of air supplying from the hopper: 1.4 m/sec
Maintaining solvent: 1.5 g/m$^2$
Rolling rate of the film: 5 m/min

Conditions of Photo-reaction

Output power of UV lamp: 3 Kw
Width of radiation: 1 m
Distance of the lamp from the film: 20 cm
Chamber size: 1.1×1.2×0.6 mm
Exposing time: 12 sec
Temperature in chamber: 50° C.

For the film modified under the above condition, the tensile strength, the elongation and the contact angle of water drops on the film surface before and after weather-ometer test for the film were measured and the results are shown the following Table 1.

EXAMPLE 2

A polyethylene film having the thickness of 100 $\mu$m was pretreated with high frequency.

Acrolein of 33 g, benzophenone of 3 g, pentaerythritol triacrylate of 5 g, ethanol amine of 2 g, UV stabilizer being the above formula (II) of 2 g (0.61 wt. % based on the total of photopolymerization solution) were solved in solvent of normal hexane to obtain a photopolymerization solution of 330 g. A film was produced in the same manner as with example 1, except for coating the above solution to thickness of 50 $\mu$m on the pre-treated film surface.

Properties for the modified film are listed in Table 1.

EXAMPLE 3

A polyethylene film having the thickness of 50 $\mu$m was pretreated with high frequency. Acryloylchloride of 18 g, benzoinperoxide of 4 g, trimethylolpropanetriacrylate of 3 g, triethylenetetramine of 3 g and UV stabilizer of 3 g (0.38 wt. %) wherein in a compound of formula (I) was mixed with the compound of formula (II) in a ratio of 50:50 by weight were dissolved in solvent of methylisobutylketone to obtain a photopolymerization solution of 800 g. A film was modified in the manner as with example 1, except for coating the above solution to a thickness of 5 $\mu$m on the pretreated film surface. Properties for the modified film, are listed in Table 1.

COMPARATIVE EXAMPLE 1

The film was modified in the same manner as with example 1, except for the use of a photopolymerization solution in which an UV stabilizer was not mixed.

Properties for the modified film are listed in Table 1.

COMPARATIVE EXAMPLE 2

The film was modified in the manner as with example 2, except for use of a photopolymerization solution which an UV stabilizer was not mixed.

Properties for the modified film are listed in Table 1.

COMPARATIVE EXAMPLE 3

The film was modified in the same manner as with example 3, except for use of a photopolymerization solution in which an UV stabilizer was not mixed.

Properties for the modified film are listed in Table 1.

COMPARATIVE EXAMPLE 4

The film was modified in the manner as with example 1, except for the use of pre-treated polyethylene film having a thickness of 50 $\mu$m and the use of a photopolymerization solution in which UV stabilizer of the formula (I) of 0.07 g (0.0097 wt. %) was mixed.

Properties of the modified film are listed in Table 1.

COMPARATIVE EXAMPLE 5

The film was modified in the same manner as with example 1 except for the use of pre-treated polyethylene film having thickness of 50 μm and use of a photopolymerization solution in which UV stabilizer of the formula (II) of 80 g (11.1 wt. %) was mixed.

Properties of the modified film were listed in Table 1.

TABLE 1

| Section | Length direction before the test | | Length direction after the test | | Width direction before the test | | Width direction after the test | | Climate resistibility | Hydrophillic property Contact angle (Degree) | Blocking property (kg/cm$^2$) |
|---|---|---|---|---|---|---|---|---|---|---|---|
| | Tensile strength (kg/cm$^2$) | Elongation | Tensile strength (kg/cm$^2$) | Elongation | Tensile strength (kg/cm$^2$) | Elongation | Tensile strength (kg/cm$^2$) | Elongation | | | |
| Example 1 | 168 | 231 | 166 | 229 | 163 | 360 | 162 | 358 | ○ | 5 | 65 |
| Example 2 | 196 | 382 | 195 | 380 | 181 | 472 | 180 | 470 | ○ | 5 | 80 |
| Example 3 | 182 | 288 | 180 | 286 | 176 | 386 | 175 | 384 | ○ | 8 | 75 |
| Comparative example 1 | 168 | 231 | 144 | 158 | 163 | 360 | 126 | 223 | X | 15 | — |
| example 2 | 196 | 382 | 165 | 251 | 181 | 472 | 159 | 348 | X | 5 | — |
| example 3 | 182 | 288 | 153 | 189 | 176 | 386 | 141 | 243 | X | 10 | — |
| example 4 | 173 | 268 | 140 | 165 | 170 | 371 | 138 | 221 | X | 15 | — |
| example 5 | 175 | 271 | 173 | 269 | 171 | 379 | 170 | 378 | ○ | 83 | — |

○: good
X: inferiority

In Table 1, the climate-resistibility was tested at the temperature of 30° C. for 72 hours by a weather-ometer manufactured by Atlas, and then the tensile strength was measured according to KS M-3504 by a Tensile Strength Tester manufactured by Instoron.

The blocking property was measured according to ASTMD 1983-67. The hydrophilic property was tested by a contact angle meter using the method for optical cast shadow. The criterion for a film having a good hydrophilic property is a contact angle less than 20 degrees.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for preparing a hydrophilic polymer film, comprising:
   (1) means for coating a polymer film, having an upper surface and a lower surface, with a solution;
   (2) a pair of air supply hoppers opposed to each other, one of said pair disposed toward said upper surface and the other of said pair disposed toward said lower surface of said polymer film; and
   (3) a light initiator comprising:
      (a) a light reaction chamber comprising a pair of opposing sides;
      (b) a pair of UV lamps disposed in said light reaction chamber between said opposing sides;
      (c) a pair of cooling fans disposed at one or both of said opposing sides; and
      (d) a solvent deflation fan disposed in said light reaction chamber.

2. The apparatus of claim 1, wherein each of said air supply hoppers comprises a distributing plate having a length of 10 to 500 cm, a width of 10 to 100 cm, and a plurality of air supply apertures having a diameter of 1 to 3 mm disposed therein.

3. The apparatus of claim 2, wherein the ratio of said apertures is 1 aperture per cm$^2$ of distributing plate surface.

4. The apparatus of claim 2, wherein each of said distributing plates is disposed at a distance of 5 to 20 cm from said upper and lower surfaces of said polymer film.

5. The apparatus of claim 1, wherein said opposing sides of said light reaction chamber each contain at least one slit having a width of 2 to 10 mm to allow the passage of said polymer film through said light reaction chamber.

6. The apparatus of claim 1, wherein said light initiator further comprises a lamp protecting tube, having a diameter of 50 to 100 mm, axially disposed about each of said UV lamps.

7. The apparatus of claim 1, wherein said light initiator further comprises an inner aluminum reflection plate.

8. The apparatus of claim 1, wherein each of said UV lamps is disposed at a distance of 5 to 50 cm from said upper surface and lower surface of said polymer film.

* * * * *